(12) United States Patent
Nadabar et al.

(10) Patent No.: US 8,464,950 B2
(45) Date of Patent: Jun. 18, 2013

(54) FAST VISION SYSTEM

(75) Inventors: Sateesha Nadabar, Framingham, MA (US); William Equitz, Waban, MA (US)

(73) Assignee: Cognex Corporation, Natick, MA (US)

( * ) Notice: Subject to any disclaimer, the term of this patent is extended or adjusted under 35 U.S.C. 154(b) by 631 days.

(21) Appl. No.: 12/341,192

(22) Filed: Dec. 22, 2008

(65) Prior Publication Data

US 2010/0155477 A1  Jun. 24, 2010

(51) Int. Cl.
*G06K 7/14* (2006.01)
*G06K 7/10* (2006.01)

(52) U.S. Cl.
CPC .................................. *G06K 7/10722* (2013.01)
USPC ........ 235/454; 235/435; 235/436; 235/462.24

(58) Field of Classification Search
CPC .................................................. G06K 7/10722
USPC .......... 235/435, 436, 462.23, 462.24, 462.41, 235/454
See application file for complete search history.

(56) References Cited

U.S. PATENT DOCUMENTS

| | | | |
|---|---|---|---|
| 5,198,648 A * | 3/1993 | Hibbard | 235/462.24 |
| 6,318,637 B1 | 11/2001 | Stoner | |
| 7,090,135 B2 | 8/2006 | Patel | |
| 7,097,102 B2 | 8/2006 | Patel et al. | |
| 7,100,830 B2 | 9/2006 | Murata et al. | |
| 7,219,843 B2 | 5/2007 | Havens et al. | |
| 2005/0173534 A1 * | 8/2005 | Hepworth et al. | 235/454 |
| 2007/0152062 A1 * | 7/2007 | He et al. | 235/462.32 |
| 2008/0011855 A1 | 1/2008 | Nadabar | |
| 2009/0108073 A1 * | 4/2009 | Gerst | 235/462.41 |

OTHER PUBLICATIONS

PCT International Search Report and Written Opinion, PCT/US2009/067510, Apr. 27, 2010.

* cited by examiner

*Primary Examiner* — Ahshik Kim
(74) *Attorney, Agent, or Firm* — Quarles & Brady LLP

(57) ABSTRACT

A method and apparatus for performing a vision process using a camera having a multi-focus lens having a lens field of view where the lens can be set at different focus positions the method comprising the steps of positioning at least one of the camera and an item to be imaged so the lens field of view is directed at the item to be imaged, obtaining a plurality of images where each image is obtained with the lens focus at a different position and after each image is obtained, attempting to perform the machine vision process using the image irrespective of whether or not the lens was focused when the image was obtained.

33 Claims, 9 Drawing Sheets

FAST VISION SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to machine vision systems and more specifically to a system wherein a fast processor is used to facilitate a machine vision process in parallel with obtaining images at different focus positions of a camera lens to expedite the overall vision process.

Machine vision systems have been developed for many different applications. For example, vision systems have been developed for reading bar codes and other types of symbols placed on packages or products to obtain information there from. Other vision systems have been developed for inspecting manufactured parts for features/characteristics.

Many vision systems include a camera for obtaining images of symbols or items to be imaged. A processor receives the images and extracts information there from which can then be used to perform one or more vision processes. In many applications the distance between a camera sensor and a symbol or item to be imaged may vary between uses. In these cases, in order to obtain useful images (i.e., images from which data required to complete machine vision processes can be extracted), an adjustable lens and auto-focus system is often provided. In these cases, when the system is activated to perform a vision process, the lens and auto-focus system automatically focus the lens so that a clear image of the symbol or item to be imaged is generated on the camera sensor. After the focusing process is completed, a clear image of the symbol or item to be imaged is obtained and is processed to complete the vision process.

Generally there are two types of auto-focus systems including "hunting" systems and "range finding" systems. In the case of hunting systems, as the label implies, a series of images (i.e., image iterations) are obtained where a focus determining process is performed between each two consecutively obtained images. Where the focus determining process indicates that the lens is not in focus, a next image is obtained with the lens at a different focus setting. The process continues until the focus determining process indicates that the lens position is focused on the symbol or item to be imaged at which point a focused image is obtained and processed to complete the vision process (e.g., find and decode a symbol in the image, etc).

In the case of range finding systems, an explicit determination of the distance of a symbol or item to be imaged from a lens or sensor is made and thereafter the lens is controlled to adjust the focus to a position associated with the determined distance. Thus, for instance, a laser light pencil beam may be directed toward a surface associated with a symbol or an item to be imaged and a reflected beam may be sensed and used to determine the symbol to sensor distance.

While hunting solutions work well in some applications, unfortunately these solutions are not fast enough for other applications where high speed vision processes are required or desirable. To this end, known auto-focus systems often require a large amount of time (e.g., tens of milliseconds) per image iteration just to adjust the lens prior to obtaining a next image in addition to the time required to perform the focus determining process to analyze each acquired image to make a decision on what to do next (i.e., obtain another image using a different focus position if not in focus and to perform the vision process on the obtained image if in focus). Overall iterative systems sometimes spend hundreds of milliseconds on focusing before even starting to perform the vision process on a focused image. This delay is noticeable to a user (e.g., a person using a swipe reader, a person using a hand held symbol reader, etc.).

Range finding systems typically operate more quickly than hunting systems. Unfortunately, however, range finding systems require dedicated range finding hardware in addition to other system hardware and therefore increase overall system costs.

BRIEF SUMMARY OF THE INVENTION

It has been recognized that high speed processors can be used to expedite the overall process of obtaining an in-focus image and performing a vision process on the image by processing images in parallel with obtaining other images at different focus positions. For instance, in some cases where a camera lens has a range of focus positions from a minimum position to a maximum position, the lens and camera sensor may be controlled to obtain a sequence of images in rapid succession with the lens focused at all different pre-determined (i.e., image independent) useful focus positions. After each image is obtained and in parallel with obtaining additional images, the obtained image is processed in some fashion to expedite the overall vision process. For instance, in some cases the obtained image may be processed to attempt to find a symbol or item feature in the image while additional images at different predetermined useful focus positions are obtained. In other cases the image may be processed to attempt to decode a symbol therein while additional images at different focus positions are obtained. Here, with an extremely fast processor there is no cost to processing images that are out of focus and the system may be able to sweep through all useful focus positions in 100 milliseconds or less obtaining and processing all useful images in rapid succession.

In other cases a processor may essentially run separate software threads where one thread handles iterative focusing and another thread simultaneously attempts to decode or find a symbol in every acquired image (i.e., in the differently focused images). With a fast processor there is no performance cost associated with processing out of focus images and, in some cases, useful information such as symbol location in the image, partially decoded data, etc., may be obtained from a slightly blurred image prior to obtaining a precisely focused image.

Consistent with the above, at least some inventive embodiments include a method for performing a vision process using a camera having a multi-focus lens having a lens field of view where the lens can be set at different focus positions the method comprising the steps of positioning at least one of the camera and a symbol to be imaged so the lens field of view is directed at the symbol to be imaged, obtaining a plurality of images where each image is obtained with the lens focus at a different position, and, after each image is obtained and while obtaining additional images, attempting to perform the vision process on the images, wherein the vision process includes one of locating a symbol in obtained images and decoding a symbol in obtained images.

In some cases the focus lens has a range of different focus positions from a minimum focus position to a maximum focus position and wherein the step of obtaining a plurality of images includes obtaining images in a sequence where the focus position starts at one end of the range and incrementally steps through the range toward the maximum focus position. In some cases the focus lens has a range of different focus positions from a minimum focus position to a maximum focus position and wherein the process continues until one of (ii) the vision process has been successfully completed for at least one of the images and (ii) the vision process has been attempted for images at each of the different focus positions. In some cases the focus lens has a range of different focus positions from a minimum focus position to a maximum focus position and wherein the process continues until the vision process has been attempted for images at each of the different focus positions. In some cases the step of obtaining a plurality of images further includes the step of selecting next focus positions as a function of data obtained from previously obtained images.

Some embodiments further include the steps of using at least a subset of the images to determine one of that the lens is focused on the symbol to be imaged and that the lens is unfocused on the symbol to be imaged and, where the lens is focused on the symbol to be imaged, ending the process after attempting to perform the machine vision process on the image corresponding to the focused lens. Some embodiments further include the steps of, when the lens is unfocused on the symbol to be imaged, using at least one of the obtained images to determine how to better focus the lens on the symbol to be imaged and adjusting the lens to better focus on the symbol to be imaged prior to obtaining another image.

Other embodiments include a method for performing a vision process using a camera having a multi-focus lens having a lens field of view where the lens can be set at different focus positions the method comprising the steps of positioning at least one of the camera and an item to be imaged so the lens field of view is directed at the item to be imaged, obtaining a plurality of images where each image is obtained with the lens focus at a different position, and after each image is obtained and while obtaining additional images, attempting to perform the vision process on the images.

Some embodiments include a method for facilitating a machine vision process using a camera having a multi-focus lens having a lens field of view, the method comprising the steps of (a) positioning at least one of the camera and an item to be imaged so the lens field of view is directed at the item to be imaged, (b) setting the lens at a focus position, (c) obtaining an image of the item with the lens at the focus position, (d) attempting to perform the machine vision process on the image and (e) while performing step (d), initiating steps (b) and (c) using a next focus position to obtain a next image of the item where the next focus position is different than any previous focus position.

Some cases further include the step of repeating step (d) using the next image. Some cases further include the step of repeating steps (d) and (e) for a plurality of lens focus positions. In some cases the machine vision process is one of a symbol reading process and a symbol locating process. Some cases further include the steps of, prior to initiating steps (b) and (c) using a next focus position, using at least one of the obtained images to determine how to better focus on the item to be imaged and selecting a next focus position to better focus on the item to be imaged.

Still other embodiments include a system for performing a vision process using a camera having a multi-focus lens having a lens field of view where the lens can be set at different focus positions, the system comprising a processor programmed to perform the steps of, controlling the camera to obtain a plurality of images where each image is obtained with the lens focus at a different position and after each image is obtained and while obtaining additional images, attempting to perform the vision process on the images, wherein the vision process includes one of locating a symbol in obtained images and decoding a symbol in obtained images.

In some cases the focus lens has a range of different focus positions from a minimum focus position to a maximum focus position and wherein the processor is programmed to control the camera to obtain a plurality of images by obtaining images in a sequence where the focus position starts at one end of the range and incrementally steps through the range toward the maximum focus position. In some cases the focus lens has a range of different focus positions from a minimum focus position to a maximum focus position and wherein the processor attempts to perform the vision process until one of (ii) the vision process has been successfully completed for at least one of the images and (ii) the vision process has been attempted for images at each of the different focus positions.

In some cases the processor is further programmed to perform the steps of using at least a subset of the images to determine one of that the lens is focused on the item and that the lens is unfocused on the item in the image and, where the lens is focused on the item in the image, ending the process after attempting to perform the machine vision process on the image corresponding to the focused lens. In some cases the processor is further programmed to perform the steps of, when the lens is unfocused on the symbol to be imaged, using at least one of the obtained images to determine how to better focus the lens on the symbol to be imaged and adjusting the lens to better focus on the symbol to be imaged prior to obtaining another image.

Some embodiments include a system for performing a vision process using a camera having a multi-focus lens having a lens field of view where the lens can be set at different focus positions, the system comprising a processor programmed to perform the steps of, obtaining a plurality of images where each image is obtained with the lens focus at a different position, and after each image is obtained and while obtaining additional images, attempting to perform the vision process on the images.

Some embodiments include a system for facilitating a machine vision process using a camera having a multi-focus lens having a lens field of view, the system comprising a processor programmed to perform the steps of, (a) setting the lens at a focus position, (b) obtaining an image of the item with the lens at the focus position, (c) attempting to perform the machine vision process on the image and (d) while performing step (c), initiating steps (a) and (b) using a next focus position to obtain a next image of the item where the next focus position is different than any previous focus position.

In some cases the processor is further programmed to repeat step (c) using the next image. In some cases the processor is further programmed to repeat steps (c) and (d) for a plurality of lens focus positions. In some cases the machine vision process is one of a symbol reading process and a symbol locating process.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

Figure 1:
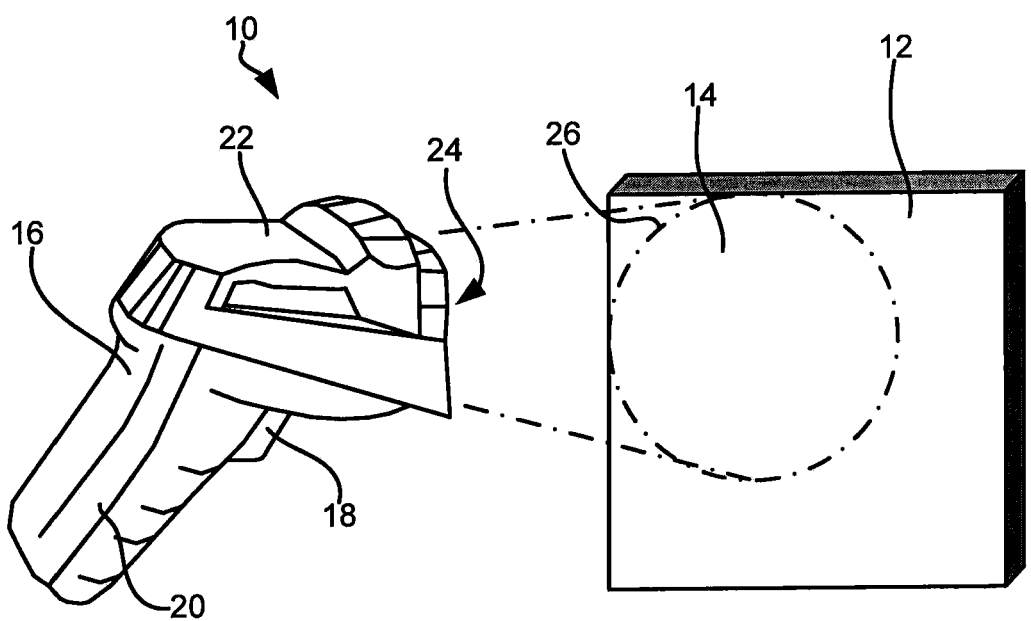
FIG. 1 is a perspective view of a hand-held reader device obtaining an image of a symbol on an item of interest that is consistent with at least some aspects of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

The various aspects of the subject invention are now described with reference to the annexed drawings, wherein like reference numerals correspond to similar elements throughout the several views. It should be understood, however, that the drawings and detailed description hereafter relating thereto are not intended to limit the claimed subject matter to the particular form disclosed. Rather, the intention is to cover all modifications, equivalents, and alternatives falling within the spirit and scope of the claimed subject matter.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Referring now to the drawings wherein like reference numerals correspond with similar elements throughout the several views and, more specifically, referring to FIG. 1, the present invention will be described in the context of an exemplary hand-held symbol reader 10 that can be used to obtain images of symbols (e.g., 14) placed on surfaces of items (e.g., 12) and that can decode the symbols in the obtained images. While the inventions herein are described in the context of hand-held device 10, it should be appreciated that the inventions may also be useful in other devices and systems including swipe reader type devices used in grocery and retail stores where customers or check-out attendants, at the label implies, swipe surfaces of items that include symbols across an area adjacent an imaging window to obtain images of the symbols thereon or systems that include stationary camera where a conveyor moves items or packages of various sizes through the field of view of the stationary camera such that the distance between the camera lens/sensor and the surface of a package or item on which the symbol is applied may vary item to item.

Referring still to FIG. 1, hand-held reader 10 includes a rigid plastic housing 16 that forms a handle section 20 and a barrel section 22 that extends from the handle section 20 in an ergonomic fashion. A trigger 18 is provided at the top end of the handle section 20 just below barrel 22. An adjustable focal length lens 24 is provided at the distal end of the barrel section 22 where the lens has a field of view 26. Lens 24 may be any type of multi-focal position lens including but not limited to a liquid lens like the liquid lens described in U.S. Pat. No. 7,264,162. In operation, a reader user positions reader 10 such that the camera or lens field of view 26 is directed toward a surface of an item 12 on which a symbol 14 has been applied where the symbol 14 is disposed within the reader's field of view 26. Once so positioned, the user presses activation trigger or actuator 18 causing reader 10 to obtain images of the symbol 14 within the field of view 26. Once a suitably focused image or symbol 14 has been obtained, a processor within reader 10 decodes the symbol and then provides the decoded information to other software applications for use. In addition, after successful decoding of the symbol 14, reader 10 may provide an indication to the user that decoding has been successful. Here, although not illustrated in FIG. 1, the indication of successful decoding may be provided via an audible beep or noise or via illumination of an LED or the like, or both.

Figure 2:
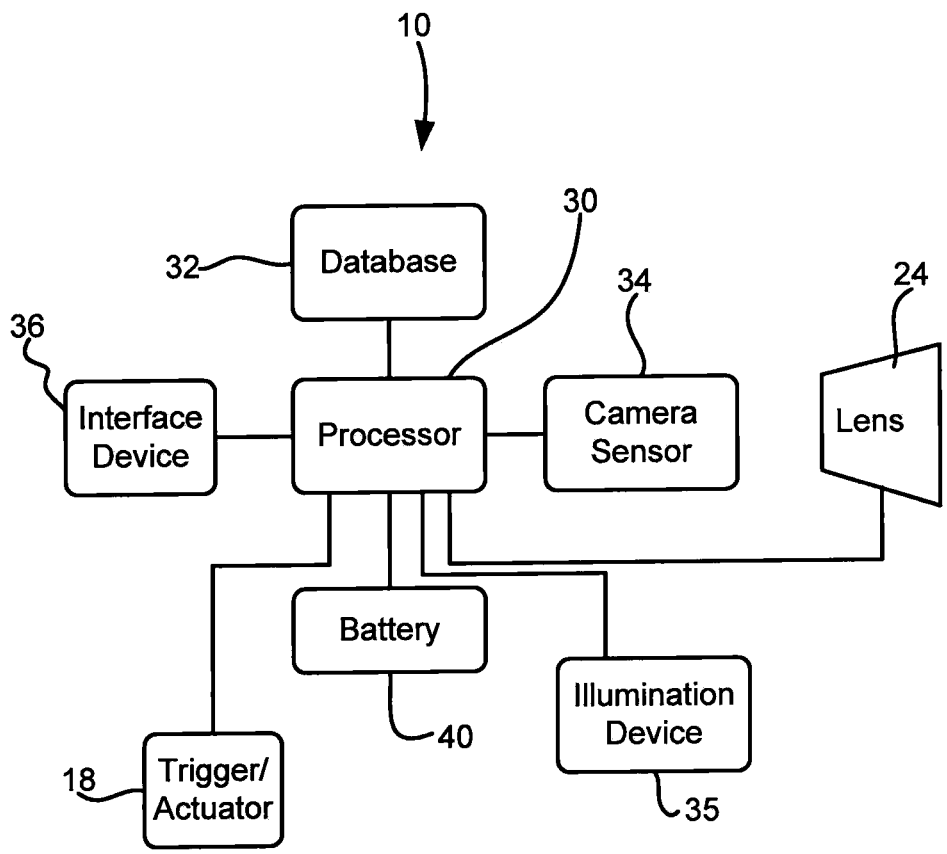
FIG. 2 is a schematic illustrating components that comprise the hand-held reader device of FIG. 1.

Referring now to FIG. 2, in addition to the components described above with respect to FIG. 1, reader 10 includes a processor 30, a camera/sensor 34, a battery 40, a database or memory 32, and one or more interface devices 36 such as an audible sound generator, an LED for indicating successful symbol decoding, etc. Processor 30 is linked to database 32 where programs performed by processor 30 are stored. In addition, processor 30 can store images obtained via camera sensor 34 in database 32. Processor 30 is also linked to camera sensor 34 for receiving image data therefrom and is linked to batter 40 for receiving power. Trigger/actuator 18 is linked to processor 30 for initiating a symbol reading process.

Processor 30 is also linked to variable focus lens 24 for modifying the focus position or focal length of the lens 24. For example, in some applications, lens 24 may be controllable to adjust the focus position or focal length of the lens 24 to anywhere between 1 inch and 24 inches. Other lens range values are contemplated including one that allows a maximum setting at infinity which corresponds to a case where the image sensor is positioned at the focal point. Hereafter, it will be assumed that lens 24 has a maximum focus position and a minimum focus position that define the lens range. In addition, it will be assumed that there are twenty total predefined lens positions including the maximum position at one extreme and the minimum position at the other extreme and eighteen incremental positions therebetween. After each image is obtained and in parallel with obtaining additional images, processor 30 attempts to decode any symbol in the previously obtained images. Where a symbol is successfully decoded, the process ends. Where the symbol is not successfully decoded, the process continues until images have been obtained for each one of the twenty possible lens positions.

Figure 3:
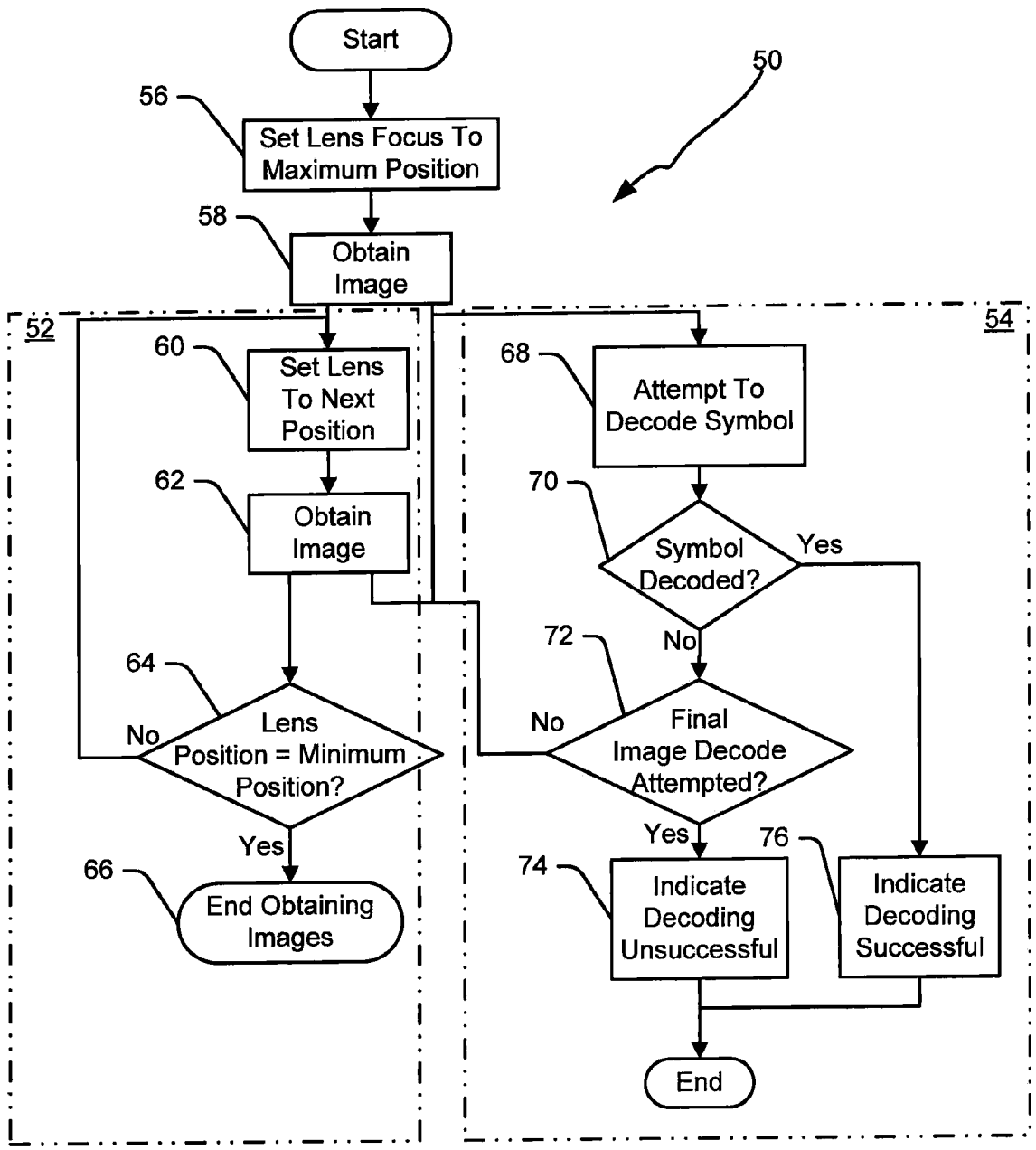
FIG. 3 is a flow chart illustrating a process that may be performed by the processor shown in FIG. 2 for rapidly obtaining images of a symbol and decoding the symbol where decoding steps occur in parallel with the sub-process used for obtaining the images.

Referring now to FIG. 3, a process or method 50 that may be performed by processor 30 described above with respect to FIG. 2 for obtaining images of a symbol within the lens field of view 26 and attempting to quickly decode the symbol is illustrated. Here, in general, the lens focus is set to a maximum position initially and is stepped through the incremental focus positions toward the minimum focus position to obtain a plurality of images of the camera's field of view where each image is obtained with the lens 24 having a different focus position or focal length.

Referring still to FIGS. 1 through 3, at process block 56, the lens 24 focus position is set to the maximum position. At block 58, a first or initial image is obtained with the lens set at the maximum focus position. After block 58, two separate processes commence in parallel. In FIG. 3, the separate processes are identified by the parallel phantom boxes labeled 52 and 54, respectively. At shown, the first sub-process 52 causes processor 30 to continue to obtain additional images of the camera's field of view with the lens 24 set to different focus positions. Sub-process 54 attempts to decode any symbols that are recognized within obtained images.

Referring yet again to FIGS. 1 through 3, according to sub-process 52, after an image is obtained at block 58, processor 30 sets the lens 24 to the next predefined intermediate focus position. At block 62, another image is obtained with the lens set to the next focus position. After block 62, control passes to process block 64 where processor 30 determines whether or not the current lens position is the minimum focus position. Where the current lens position is not the minimum focus position, control passes back up to block 60 where processor 30 again sets the lens focus position to a next predefined intermediate focus position, incrementing toward the minimum focus position. The process including blocks 60, 62 and 64 continues until the lens position is the minimum focus position at block 64, after which control passes to block 66 where processor 30 stops obtaining images via the camera sensor 34. Referring still to FIG. 3, and once again to block 62, in parallel with determining whether or not the lens position is the minimum focus position at block 64, after an image is obtained at block 62, control also passes to block 68 where processor 30 attempts to decode the image obtained at block 62.

Referring still to FIGS. 1 through 3, after an image is obtained at either of blocks 58 or 62, at block 68 processor 30 attempts to decode any symbol in the obtained image. At decision block 70, if the attempt to decode a symbol is unsuccessful, control passes to block 72 where processor 30 determines whether or not the processor 30 has attempted to decode a final image in the series of images to be obtained. Where the most recent attempt to decode at block 68 does not correspond to a final image, control passes back up to block 68 where a next obtained image is examined for decoding purposes. If the most recent decoding attempt at block 68 corresponds to the final image at block 72, control passes to block 74 where reader 10 indicates that the decoding attempt has been unsuccessful.

Here, an unsuccessful decoding attempt can be indicated via an audible sound (e.g., a beep or buzz that is discernibly different than an audible sound associated with a successful decoding process) or illumination of an LED or the like. In addition, unsuccessful decoding may be indicated by simply not indicating successful decoding. Unsuccessful decoding may be because the reader 10 is positioned such that the lens 24 cannot focus sufficiently on the symbol for reading purposes and in that case a reader user can simply move the reader device 10 closer to or further away from the surface on which the symbol resides and activate the trigger 18 again to repeat the process described above.

Referring still to FIGS. 1 through 3, at block 70, where symbol 14 is successfully decoded, control passes to block 76 where successful decoding may be indicated. At described above, successful decoding may be indicated via generation of an audible noise or illumination of an LED or light or both.

Referring once again to FIG. 3, here, it should be appreciated that the overall time required to successfully decode a symbol is substantially reduced where a high speed processor 30 is used to attempt decode symbols in obtained images in parallel with obtaining additional images at different lens focus positions. In some cases only a subset of images corresponding to a subset of the possible focus position may have to be obtained as a symbol may be successfully decoded in one of those images prior to obtaining subsequent images. For example, in the exemplary system described here where there are twenty incremental lens positions, it may be that after a fifth image corresponding to a fifth lens position is obtained, the symbol 14 is successfully decoded in that fifth image after which subsequent images no longer have to be obtained and decoded.

Figure 4:
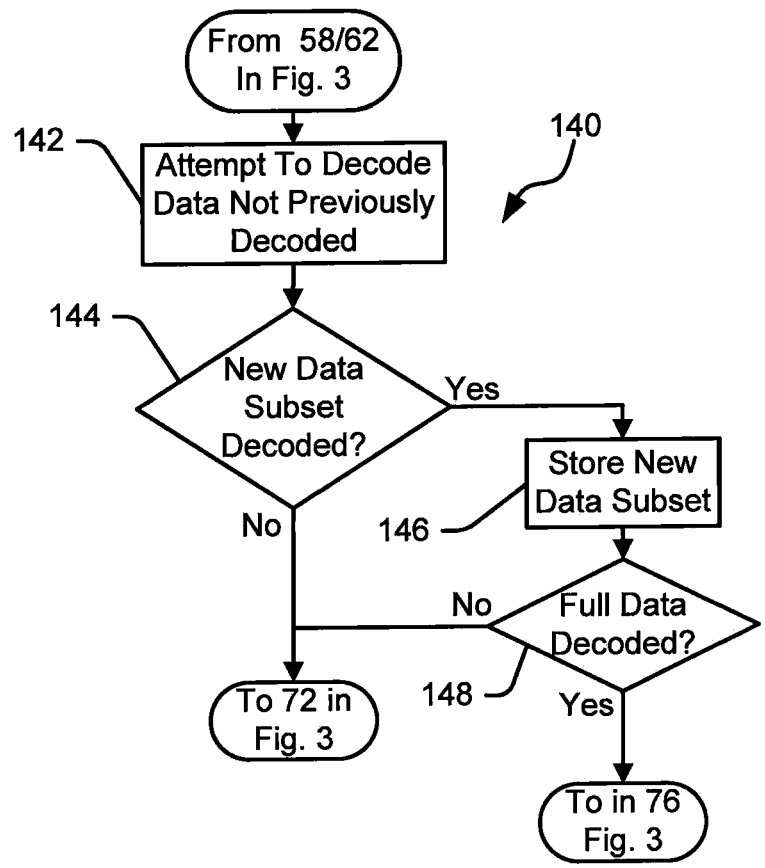
FIG. 4 is a flow chart illustrating a sub-process that may be substituted for a portion of the process shown in FIG. 3 that is consistent with some aspects of the present invention.

In at least some embodiments it is contemplated that prior to generating an image that is precisely focused on a symbol, a different, somewhat blurred image may be generated that, despite being blurred, may nevertheless be useful to decode at least some of the data to be decoded for the symbol thereby expediting the steps required to decode the complete symbol after a precisely focused image is obtained. To this end, a sub-process 140 that may be substituted for a portion of process 50 shown in FIG. 3 is illustrated in FIG. 4. After either of blocks 58 or 62 in FIG. 3, control may pass to block 142 in FIG. 4 where processor 30 (see again FIG. 2) attempts to decode data that has not subsequently been decoded in a previously obtained image. At block 144, where a new data subset has been decoded, control of processor 30 pass to process block 146 where the new data subset is stored. Next, at block 148, where all of the data associated with a symbol 14 has been decoded, control passes back to block 76 in FIG. 3 where successful decoding is indicated. At block 148, however, where all of the data associated with the symbol 14 has not been decoded, control passes back to block 72 in FIG. 3 where the process described above continues.

Referring still to FIG. 4, at block 144, where a new data subset has not been decoded, control passes to block 72 in FIG. 3 where the process described above is repeated. Thus, each time a new portion or subset of data associated with a symbol 14 is decoded at block 144, that data is added to a database subset until all of the data associated with the symbol 14 has been decoded properly. Here, a practical example is in order.

Referring again to FIG. 1, assume that reader 10 can auto-discriminate between different code types where each code type has to be decoded in a different manner. Here, the code type has to be discerned prior to actually attempting to decode a symbol of that type. Often, different code types will have completely different appearances or different mark features that can be used to distinguish one code type from another where those features or appearances can be discerned from a blurred image while the actual data to be decoded cannot be easily be discerned from a blurred image. In this case, the auto-discrimination portion of a decoding process may be performed using a blurred image prior to obtaining a precisely focused image and the decoding process may be executed more rapidly after the precisely focused image is obtained because the auto-discrimination process has been completed. Other iterative decoding processes where partial decoding occurs with a blurred image prior to obtaining a precisely focused image are contemplated.

Figure 5:
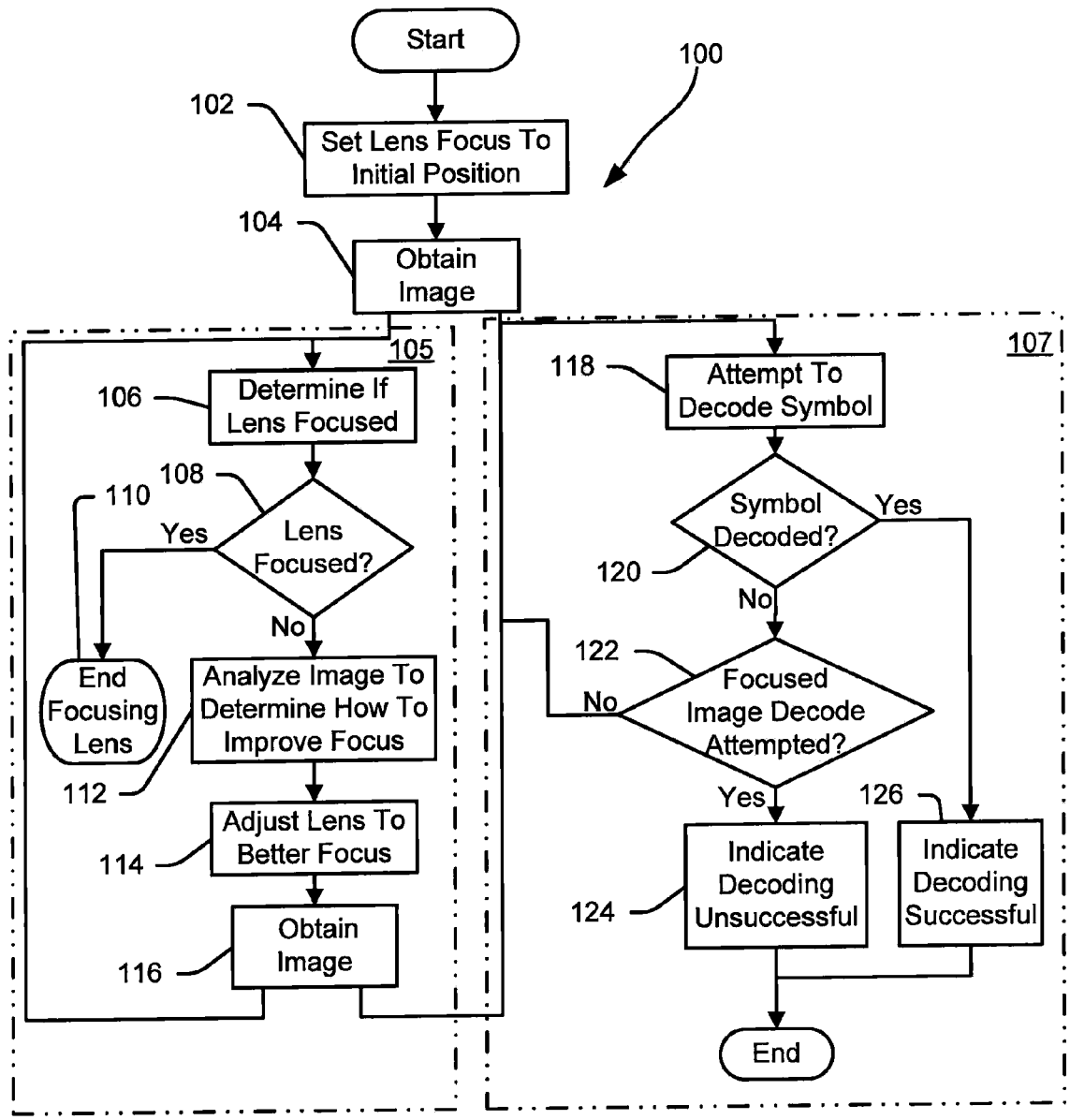
FIG. 5 is a flow chart illustrating a process similar to the process shown in FIG. 3, albeit where decoding is attempted in parallel with an auto-focus sub-process.

Referring now to FIG. 5, another method or process 100 that may be performed via the hand-held reader processor 30 shown in FIG. 2 is illustrated wherein, as images are obtained via the reader 10, parallel processes are performed including an auto-focus process and a simultaneous decoding process to expedite the overall decoding of a symbol.

Referring also to FIGS. 1 and 2, at process block 102, lens 24 is set to an initial focus position. At block 104 an initial image is obtained with the lens at the initial focus position. After block 104, two parallel and separate sub-processes commence including an auto-focus sub-process identified by numeral 105 and a decoding process identified by numeral 107. Referring to the auto-focus process 105, at process block 106, processor 30 determines if the lens is focused on the symbol 14. Methods and algorithms for using obtained images to determine whether or not a lens is focused is well known in the art and therefore will not be described here in detail. Here, it should suffice to say that the processor 30 can examine an obtained image quickly and assess whether or not the image is focused. After block 106, control passes to process block 108 where, if the lens is focused on the symbol 14, the focusing process ends at block 110. If the lens is not focused at process block 108, control passes to block 112 where processor 30 determines how the lens can be adjusted to improve focus on the symbol 14. At block 114, processor 30 adjusts the lens to better focus on the symbol 14 at block 116 and a new or next image is obtained. After block 116, control passes back up to block 106 where the process including blocks 106, 108, 110, 112 and 114 continues until a focused image of the symbol is obtained. In addition, after block 116, control passes to block 118 in the decoding sub-process 107.

Referring still to FIGS. 1, 2 and 5, at block 118, processor 30 attempts to decode any symbol perceived within an obtained image. At block 120, if the symbol 14 is successfully decoded, control passes to block 126 where processor 30 indicates successful decoding (e.g., via an audible sound, lighting of an LED or illumination device, or both). At block 120, where a symbol is not successfully decoded, control passes to block 122 where processor 30 determines whether or not the processor has already attempted to decode a focused image. Where the processor has not already attempted to decode a focused image, control passes back up to block 118 where the processor continues to attempt to decode obtained images. At block 122, where the processor has attempted to decode a focused image and the attempt has been unsuccessful (e.g., see 120 in FIG. 5), control passes from block 122 to block 124 where processor 30 indicates unsuccessful decoding.

Although not illustrated, a sub-process akin to the sub-process described above with respect to FIG. 4 may be included in or substituted for a portion of the process shown in FIG. 5 so that if some decoding can be performed using a blurred image, that decoding can be completed prior to obtaining a precisely focused image so that the overall process can be expedited in a manner similar to that described above with respect to FIG. 4.

Figure 6:
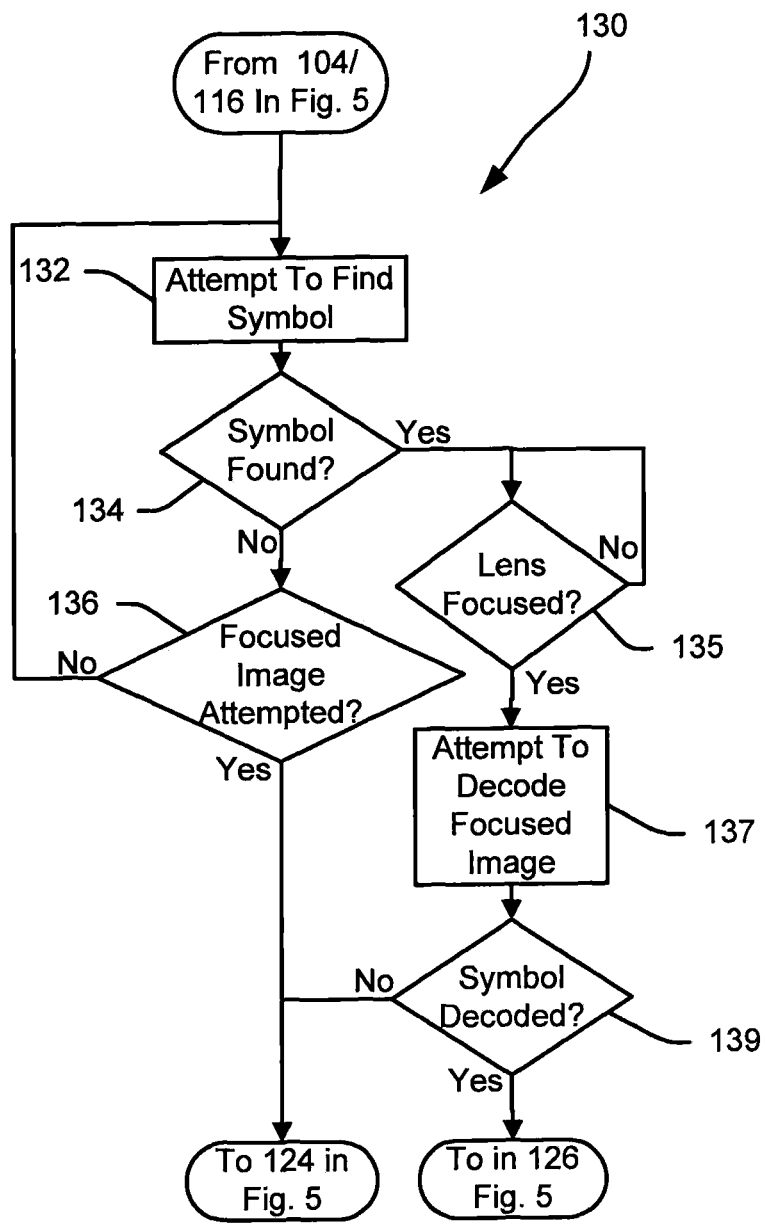
FIG. 6 is a sub-process that may be substituted for a portion of the process shown in FIG. 5 wherein prefocused images may be used to find a symbol in an image and decoding occurs using a focused image.

While the processes are described above with respect to obtaining images of symbols and decoding those symbols, it should be appreciated that other machine vision processes are contemplated that may be expedited using the present invention. For example, the program run by processor 30 may cause the processor 30 to only use blurred images to attempt to identify the location of or find a symbol within those images and decoding may thereafter only occur using a precisely focused image. Here, while the actual decoding takes place after a focused image is obtained, the overall process is still expedited because the steps required to find the symbol are performed in parallel with the image obtaining process. Referring now to FIG. 6, a sub-process that may be substituted for a portion of the process shown in FIG. 5 is illustrated where blurred images are used to locate a symbol prior to obtaining a precisely focused image. Referring also to FIGS. 1 and 2, after either of blocks 104 or 116 in FIG. 5, control may pass to block 132 in FIG. 6 where processor 30 attempts to find a symbol in an obtained image. At block 134, where a symbol cannot be located within an obtained image, control passes to process block 136 where processor 30 determines whether or not the processor has attempted to find the symbol 14 in a focused image. Where the processor has not attempted to find a symbol in a focused image, control passes back up to block 132 where the process described above continues. Continuing at block 136, where the processor has attempted to find the symbol in a focused image, control passes back to block 124 in FIG. 5 where the process described above continues.

Referring still to FIGS. 1, 2 and 6, at block 134, once a symbol is found within an image, control passes to block 135 where processor 30 determines whether or not the lens is focused. Once a lens is focused, control passes to block 137 where processor 30 attempts to decode the symbol is the focused image. Here, because the location of the symbol is already known, the decoding process is expedited. At block 139, if the symbol is not decoded successfully, control passes back up to block 124 in FIG. 5 where the process described above continues. At block 139, when the symbol is successfully decoded, control passes to block 126 in FIG. 5 where successful decoding is indicated as described above.

While the sub-process shown in FIG. 6 is described as being substituted for a portion of the process shown in FIG. 5, it should be appreciated that a similar sub-process may be substituted for a portion of the process shown in FIG. 3 to achieve a similar result.

Figure 7:
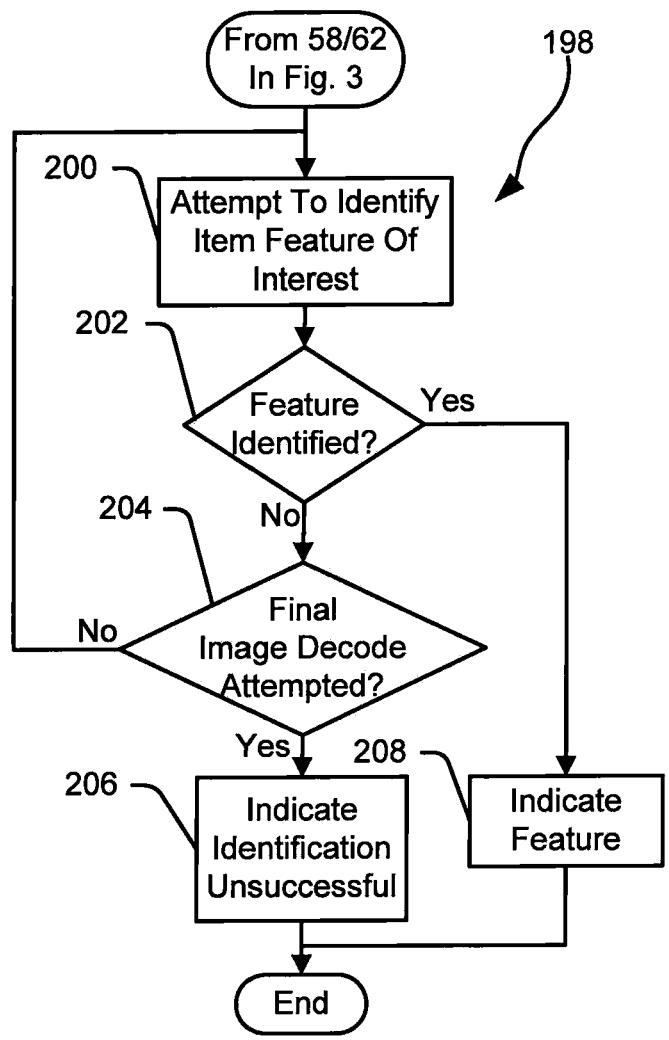
FIG. 7 is a sub-process that may be substituted for a portion of the process shown in FIG. 3, albeit for attempting to identify a feature of interest of an item instead of decoding a symbol.

As another example, instead of attempting to find or decode a symbol in an image, other systems and methods may be provided for attempting to identify item or object features of interest within images obtained. To this end, a sub-process 198 that may be substituted for a portion of the process shown in FIG. 3 is illustrated in FIG. 7. Referring also to FIGS. 1 and 2, after either of blocks 58 or 62 in FIG. 3 control may pass to block 200 in FIG. 7. At process block 200, processor 30 attempts to identify an item feature of interest within an obtained image. At decision block 202, where a feature of interest has been identified, control passes to block 208 where processor 30 indicates that the feature has been identified after which the process ends. At block 202, if a feature cannot be identified in an obtained image, control passes to block 204 where processor 30 determines whether or not the processor attempted to identify the feature of interest in a final image. Where the final image has not been examined for the feature of interest, control passes back up to block 200 where the process described above continues. Once the final image has been attempted at block 204 and the feature has not been identified in any of the obtained images, control passes to block 206 where processor 30 indicates an unsuccessful attempt to identify the feature of interest in any of the images.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

Thus, the invention is to cover all modifications, equivalents, and alternatives falling within the spirit and scope of the invention as defined by the following appended claims. For example, instead of cycling from maximum to minimum focal points, methods may cycle from minimum to maximum, may start at some intermediate focal point and cycle to the maximum or minimum point and then cycle in the opposite direction, may start with the focal point or position associated with the most recent successful imaging/decoding process or thereabout and cycle toward maximum or minimum, etc.

As another example, while the systems described above attempt to complete a vision process (e.g., decoding of a symbol) while obtaining images at different focal positions, other systems are also contemplated where other "image formation" settings are adjusted in parallel with changes in focus. For instance, where a symbol reader includes an illumination device (see 35 in FIG. 2), light brightness may be adjusted to multiple different settings for each focal position where a separate image is obtained for each focal position-light brightness combination and decoding attempts are made for each obtained image. As another example, different sensor gains and/or exposure durations may be used to obtain images at each different focal position where decoding attempts are in parallel with image capture processes.

As yet one more example, while embodiments are described above as including systems that step the focus position through discrete steps where separate images are obtained at each step, in other embodiments a lens may simply be driven from one limit focal position toward the other limit position and images may be rapidly obtained as the lens focal position is adjusted so that a series of images are obtained at the limit positions and at a series of intermediate positions. In this case the exposure period for each of the images would have to be set so that there would be no or minimal blurring and so that, while the lens focus is changing, the degree of focus change is minimal or acceptable during each exposure period. Here, acceptable means that when the lens is at the focused position, the image captured is of sufficient quality that the imaging process to be performed can be successfully completed.

For example, where the lens 24 is a liquid lens, the lens may start at a minimum focal position that occurs when a minimum voltage is applied to the lens. The applied voltage may be stepped from the minimum voltage to a maximum voltage corresponding to a maximum focus position. In this case the adjustment from minimum to maximum focus position will occur over adjustment duration. For instance, the adjustment duration may be 60 milliseconds. During the adjustment period, the exposure period may be set to a short period such as 100 microseconds and, during the 60 microsecond exposure period a separate image may be obtained every 1 millisecond so that 60 images are obtained during the adjustment period. In this case processing of the 60 images may commence once the first image is obtained and in parallel with obtaining subsequent images in a manner consistent with the embodiments described above. In other embodiments image processing may be performed rapidly after all of the 60 images are obtained.

Figure 8:
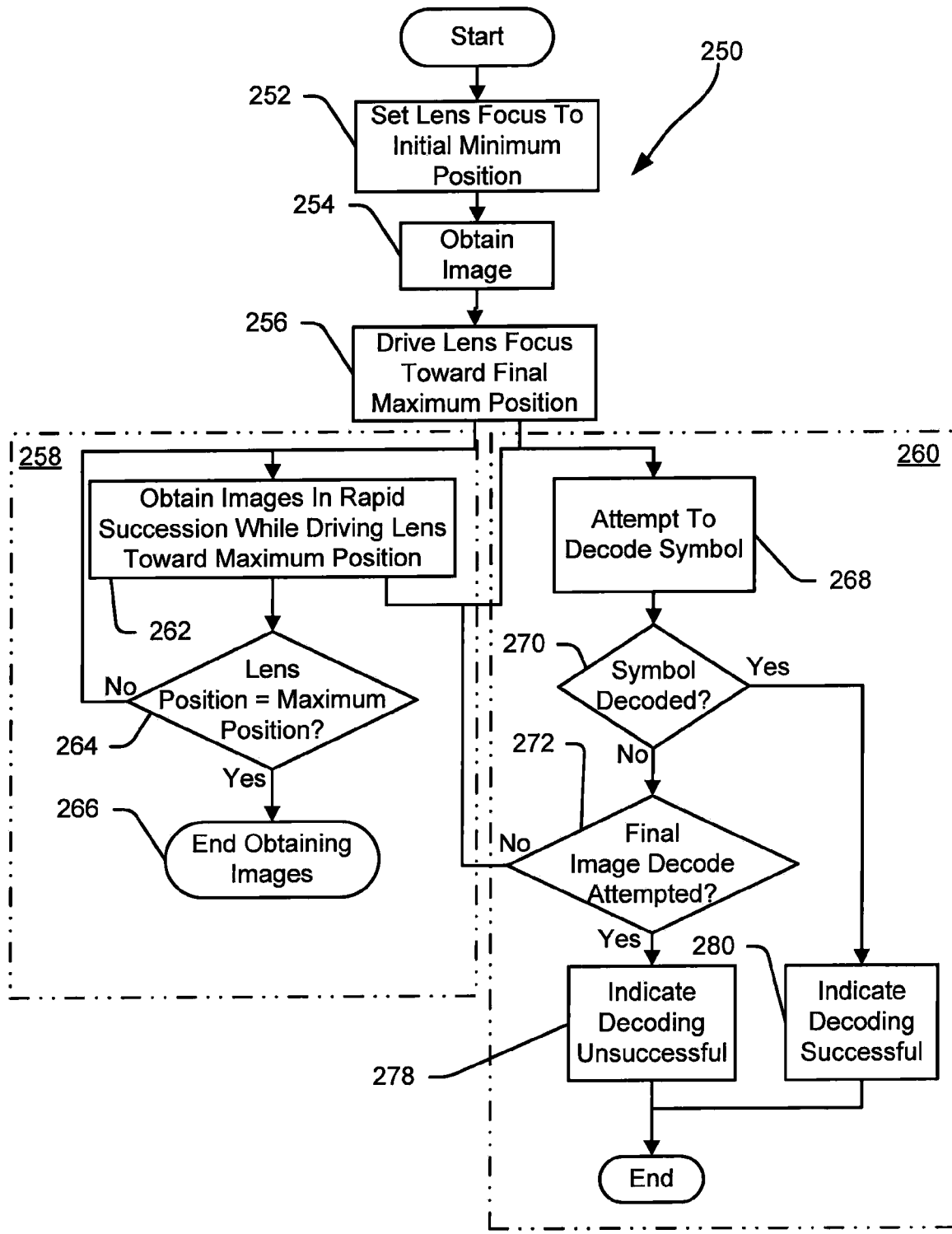
FIG. 8 is an illustration of another process that may be performed by the processor of FIG. 2 that is consistent with at least some embodiments of the present disclosure.

Consistent with the above comments, referring to FIG. 8 a method 250 for obtaining a plurality of images while continuously driving a lens from a minimum position toward a maximum position is illustrated where images are processed in parallel with image acquisition to attempt to decode a symbol that may appear in one of the images. At block 252 a lens focus is set to a minimum focal position. At block 254 a first image is obtained with the lens at the minimum focal position. At block 256 the lens is driven toward the final maximum position. Here, in the case of a liquid lens, the applied voltage is stepped from a minimum level to a maximum level in one step.

Referring still to FIG. 8, after block 258 control passes to both parallel sub-processes 258 and 260. According to sub-process 258, at block 262 images are obtained in rapid succession while driving the lens toward the maximum position so that intermediate focal position images are obtained. Here, again, where the settling time for the lens is 60 microseconds and the exposure period is set to 1 microsecond, a total of 60 images would be obtained during the settling duration. At block 264 where the lens position is not the maximum focal position, control passes back up to block 262 where more images are obtained. Once the maximum lens position is achieved, the process of obtaining images ends at block 266.

Referring to sub-process 260, at block 268 the processor attempts to decode a symbol in one of the obtained images. Where the symbol is decoded at block 270, control passes to block 280 where successful decoding is indicated. Where decoding is not successful with a specific image, the processes moves to block 272 where, if it has not been attempted to decode the final image obtained, control passes back up to block 268 where another decoding attempt is made with a different image. Once decoding has been attempted for a final image, control passes to block 278 where unsuccessful decoding is indicated.

Figure 9:
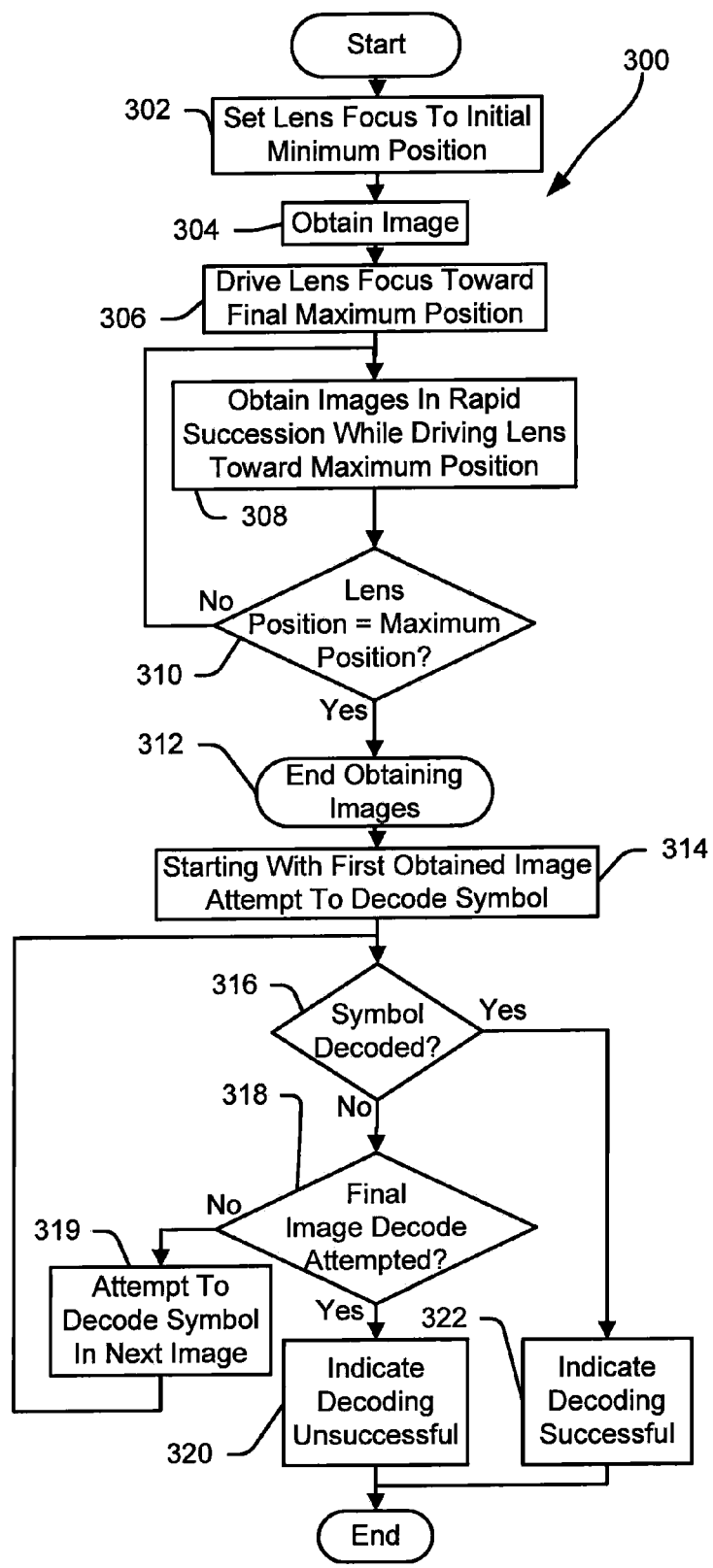
FIG. 9 is an illustration of one more process that may be performed by the processor of FIG. 2 that is consistent with at least some embodiments of the present disclosure.

Referring now to FIG. 9, yet one more process 300 consistent with at least some inventive embodiments is shown where decoding attempts occur only after a series of images are rapidly obtained and stored. To this end, at block 302 a lens focus is set to a minimum focal position. At block 304 a first image is obtained with the lens at the minimum focal position. At block 306 the lens is driven toward the final maximum position. Here, in the case of a liquid lens, the applied voltage is stepped from a minimum level to a maximum level in one step.

Referring still to FIG. 9, after block 306 control passes to block 308 where images are obtained in rapid succession while driving the lens toward the maximum position so that intermediate focal position images are obtained. The obtained images are stored in a memory for subsequent analysis. Here, again, where the settling time for the lens is 60 microseconds and the exposure period is set to 1 microsecond, a total of 60 images would be obtained during the settling duration. At block 310 where the lens position is not the maximum focal position, control passes back up to block 308 where more images are obtained. Once the maximum lens position is achieved, the process of obtaining images ends at block 312.

At block 314 the processor attempts to decode a symbol in the first obtained image. Where the symbol is decoded at block 316, control passes to block 322 where successful decoding is indicated. Where decoding is not successful with a specific image, the processes moves to block 318 where, if decoding of a symbol in the final image has not been attempted, control passes to block 319 where another decoding attempt is made with a different image. Once decoding has been attempted for a final image, control passes to block 320 where unsuccessful decoding is indicated.

Here it should be appreciated that either of the processes described above with respect to FIG. 8 or 9 could be performed for a machine vision process other than decoding of a symbol. For instance, either of the processes could be performed simply for finding a symbol within an image, for locating a specific pattern of item feature within an image, for assessing when a lens is properly focused on an item or symbol to be imaged, decodes, etc., for assessing lens focus state, etc.

To apprise the public of the scope of this invention, the following claims are made:

What is claimed is:

1. A method for performing a vision process using a camera having a multi-focus lens having a lens field of view where the lens can be set at different focus positions the method comprising the steps of:
    positioning at least one of the camera and a symbol to be imaged so the lens field of view is directed at the symbol to be imaged;
    setting an image formation setting;
    obtaining a subset of images at each of a plurality of different lens focus positions where the image formation setting is different for each of the images obtained at each lens focus position; and
    after each image is obtained and while obtaining additional images, attempting to perform the vision process on the images;
    wherein the vision process includes one of locating a symbol in obtained images and decoding a symbol in obtained images.

2. The method of claim 1 wherein the focus lens has a range of different focus positions from a minimum focus position to a maximum focus position and wherein the step of obtaining a plurality of images includes obtaining images in a sequence where the focus position starts at one end of the range and incrementally steps through the range toward the other end of the range.

3. The method of claim 1 wherein the focus lens has a range of different focus positions from a minimum focus position to a maximum focus position and wherein the process continues until one of (i) the vision process has been successfully completed for at least one of the images and (ii) the vision process has been attempted for images at each of the different focus positions.

4. The method of claim 1 wherein the focus lens has a range of different focus positions from a minimum focus position to a maximum focus position and wherein the process continues until the vision process has been attempted for images at each of the different focus positions.

5. The method of claim 1 wherein the step of obtaining a plurality of images further includes the step of selecting next focus positions as a function of data obtained from previously obtained images.

6. The method of claim 1 further including the steps of using at least a subset of the images to determine one of (i) that the lens is focused on the symbol to be imaged, and (ii) that the lens is unfocused on the symbol to be imaged and, where the lens is focused on the symbol to be imaged, ending the process after attempting to perform the machine vision process on the image corresponding to the focused lens.

7. The method of claim 6 further including the steps of, when the lens is unfocused on the symbol to be imaged, using at least one of the obtained images to determine how to better focus the lens on the symbol to be imaged and adjusting the lens to better focus on the symbol to be imaged prior to obtaining another image.

8. The method of claim 1 wherein the image formation setting is at least one of light brightness, exposure duration and image sensor gain.

9. A method for performing a vision process using a camera having a multi-focus lens having a lens field of view where the lens can be set at different focus positions the method comprising the steps of:
    positioning at least one of the camera and an item to be imaged so the lens field of view is directed at the item to be imaged;
    setting an image formation setting;
    obtaining a subset of images at each of a plurality of different lens focus positions where the image formation setting is different for each of the images obtained at each lens focus position; and
    after each image is obtained and while obtaining additional images, attempting to perform the vision process on the images.

10. A method for facilitating a machine vision process using a camera having a multi-focus lens having a lens field of view, the method comprising the steps of:
    a. positioning at least one of the camera and an item to be imaged so the lens field of view is directed at the item to be imaged;
    b. setting an image formation setting;
    c. obtaining an image of the item with the lens at the focus position and with the set image formation setting;
    d. attempting to perform the machine vision process on the image;
    e. while performing step (d), initiating steps (b) through (d) using a different image formation setting to obtain a next image of the item; and
    f. after a subset of images have been obtained using different image formation settings at the focus position, while performing step (d), initiating steps (a) through (e) using a next focus position to obtain a next image of the item where the next focus position is different than any previous focus position.

11. The method of claim 10 further including the step of repeating step (d) using the next image.

12. The method of claim 10 further including the step of repeating steps (d) and (e) for a plurality of lens focus positions.

13. The method of claim 10 wherein the machine vision process is one of a symbol reading process and a symbol locating process.

14. The method of claim 10 further including the steps of, prior to initiating steps (b) and (c) using a next focus position, using at least one of the obtained images to determine how to better focus on the item to be imaged and selecting a next focus position to better focus on the item to be imaged.

15. A system for performing a vision process using a camera having a multi-focus lens having a lens field of view where the lens can be set at different focus positions, the system comprising:
   a processor programmed to perform the steps of:
   setting an image formation setting;
   controlling the camera to obtain a subset of images at each of a plurality of different lens focus positions where the image formation setting is different for each of the images obtained at each lens focus position; and
   after each image is obtained and while obtaining additional images, attempting to perform the vision process on the images;
   wherein the vision process includes one of locating a symbol in obtained images and decoding a symbol in obtained images.

16. The system of claim 15 wherein the focus lens has a range of different focus positions from a minimum focus position to a maximum focus position and wherein the processor is programmed to control the camera to obtain a plurality of images by obtaining images in a sequence where the focus position starts at one end of the range and incrementally steps through the range toward the maximum focus position.

17. The system of claim 15 wherein the focus lens has a range of different focus positions from a minimum focus position to a maximum focus position and wherein the processor attempts to perform the vision process until one of (i) the vision process has been successfully completed for at least one of the images and (ii) the vision process has been attempted for images at each of the different focus positions.

18. The system of claim 15 wherein the processor is further programmed to perform the steps of using at least a subset of the images to determine one of (i) that the lens is focused on the symbol, and (ii) that the lens is unfocused on the symbol and, where the lens is focused on the symbol, ending the process after attempting to perform the machine vision process on the image corresponding to the focused lens.

19. The system of claim 18 wherein the processor is further programmed to perform the steps of, when the lens is unfocused on the symbol, using at least one of the obtained images to determine how to better focus the lens on the symbol and adjusting the lens to better focus on the symbol to be imaged prior to obtaining another image.

20. The system of claim 15 wherein the image formation setting is at least one of light brightness, exposure duration and image sensor gain.

21. A system for performing a vision process using a camera having a multi-focus lens having a lens field of view where the lens can be set at different focus positions, the system comprising:
   a processor programmed to perform the steps of:
   setting an image formation setting;
   obtaining a subset of images at each of a plurality of different lens focus positions where the image formation setting is different for each of the images obtained at each lens focus position; and
   after each image is obtained and while obtaining additional images, attempting to perform the vision process on the images.

22. A system for facilitating a machine vision process using a camera having a multi-focus lens having a lens field of view, the system comprising:
   a processor programmed to perform the steps of:
   a. setting the lens at a focus position;
   b. setting an image formation setting;
   c. obtaining an image of the item with the lens at the focus position and with the set image formation setting;
   d. attempting to perform the machine vision process on the image;
   e. while performing step (d), initiating steps (b) through (d) using a different image formation setting to obtain a next image of the item; and
   f. after a subset of images have been obtained using different image formation settings at the focus position, while performing step (d), initiating steps (a) through (e) using a next focus position to obtain a next image of the item where the next focus position is different than any previous focus position.

23. The system of claim 22 wherein the processor is further programmed to repeat step (f) for a plurality of lens focus positions.

24. The system of claim 22 wherein the machine vision process is one of a symbol reading process and a symbol locating process.

25. A method for obtaining a plurality of images using a camera having a multi-focus lens having a lens field of view where the lens has a range of focus positions between a maximum focus position and a minimum focus position, the method comprising the steps of:
   positioning at least one of the camera and an item to be imaged so the lens field of view is directed at the item to be imaged;
   setting the lens focus position at one of the maximum and minimum positions;
   driving the lens focus position from the one of the maximum and minimum focus positions toward the other of the maximum and minimum focus positions; and
   while driving the lens toward the other of the maximum and minimum focus positions, obtaining and storing a plurality of sequential images;
   after the lens focus position is at the other of the maximum and minimum positions and the sequence of images has been stored prior to attempting to perform a machine vision process on any of the stored images, attempting to perform a machine vision process on each of the images until the process is successfully performed on at least one of the obtained images.

26. The method of claim 25 further including the steps of obtaining images at the maximum and the minimum lens focus positions.

27. The method of claim 25 wherein the step of attempting to perform a machine vision process includes, when the machine vision process is successfully performed on at least one of the images, halting further image acquisition.

28. The method of claim 27 further including the step of, when the machine vision process is successfully performed on at least one of the images, indicating that the machine vision process has been successfully completed.

29. The method of claim 27 wherein the machine vision process is one of locating a symbol in an image and decoding a symbol in an image.

30. A system for obtaining a plurality of images using a camera having a multi-focus lens having a lens field of view where the lens has a range of focus positions between a maximum focus position and a minimum focus position, the method comprising the steps of:
- with at least one of the camera and an item to be imaged positioned so the lens field of view is directed at the item to be imaged;
- a processor programmed to perform the steps of:
- setting the lens focus position at one of the maximum and minimum positions;
- driving the lens focus position from the one of the maximum and minimum focus positions toward the other of the maximum and minimum focus positions;
- while driving the lens toward the other of the maximum and minimum focus positions, obtaining and storing a plurality of sequential images; and
- after the lens focus position is at the other of the maximum and minimum positions and the sequence of images has been stored prior to attempting to perform a machine vision process on any of the stored images, attempting to perform a machine vision process on each of the images until the process is successfully performed on at least one of the obtained images.

31. The system of claim 30 wherein the processor is further programmed to perform the steps of obtaining images at the maximum and the minimum lens focus positions.

32. The system of claim 30 wherein the step of attempting to perform a machine vision process includes, when the machine vision process is successfully performed on at least one of the images, halting further image acquisition.

33. The system of claim 32 wherein the processor is further programmed to perform the steps of, when the machine vision process is successfully performed on at least one of the images, indicating that the machine vision process has been successfully completed.

* * * * *